(12) United States Patent
Merler et al.

(10) Patent No.: US 11,830,241 B2
(45) Date of Patent: Nov. 28, 2023

(54) AUTO-CURATION AND PERSONALIZATION OF SPORTS HIGHLIGHTS

(71) Applicant: INTERNATIONAL BUSINESS MACHINES CORPORATION, Armonk, NY (US)

(72) Inventors: Michele Merler, Yorktown Heights, NY (US); Dhiraj Joshi, Yorktown Heights, NY (US); Quoc-Bao Nguyen, Stamford, CT (US); Stephen C. Hammer, Marietta, GA (US); John Joseph Kent, North Attleboro, MA (US); John R. Smith, New York, NY (US); Rogerio Feris, Hartford, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/752,641

(22) Filed: Jan. 25, 2020

(65) Prior Publication Data

US 2020/0162799 A1 May 21, 2020

Related U.S. Application Data

(63) Continuation of application No. 15/921,653, filed on Mar. 15, 2018, now Pat. No. 10,595,101.

(51) Int. Cl.
*H04N 21/233* (2011.01)
*H04N 21/234* (2011.01)
(Continued)

(52) U.S. Cl.
CPC ............... *G06V 10/82* (2022.01); *G06N 3/04* (2013.01); *G06N 3/08* (2013.01); *G06N 20/00* (2019.01);
(Continued)

(58) Field of Classification Search
CPC ......... H04N 21/8549; H04N 21/25891; H04N 21/44; H04N 21/442; H04N 21/23418;
(Continued)

(56) References Cited

U.S. PATENT DOCUMENTS 10,595,101 B2 * 3/2020 Merler ................. G06K 9/6267
10,679,070 B1 * 6/2020 Poutivski ............... G06N 20/20
(Continued)

OTHER PUBLICATIONS

Agrawal, P et al., "Learning to see Moving", arXiv:1505.01596v2 [cs.CV] (2015); 12 pgs.
(Continued)

*Primary Examiner* — Hsiungfei Peng
(74) *Attorney, Agent, or Firm* — Intelletek Law Group, PLLC; Gabriel Daniel, Esq.

(57) ABSTRACT

A method and system for auto-curating a media are provided. Media content is received over the network interface. A set of markers is identified for the media content, each marker corresponding to one of a plurality of visible and audible cues in the media content. Segments in the media content are identified based on the identified set of markers. An excitement score is computed for each segment based on the identified markers that fall within the segment. A highlight clip is generated by identifying segments having excitement scores greater than a threshold.

19 Claims, 8 Drawing Sheets

(51) Int. Cl.

| | |
|---|---|
| *H04N 21/25* | (2011.01) |
| *G06N 20/10* | (2019.01) |
| *G06V 10/82* | (2022.01) |
| *H04N 21/8549* | (2011.01) |
| *G06N 3/08* | (2023.01) |
| *G06N 3/04* | (2023.01) |
| *H04N 21/439* | (2011.01) |
| *H04N 21/431* | (2011.01) |
| *H04N 21/466* | (2011.01) |
| *H04N 21/442* | (2011.01) |
| *H04N 21/44* | (2011.01) |
| *G06N 20/00* | (2019.01) |
| *G06V 20/40* | (2022.01) |
| *G06V 40/16* | (2022.01) |
| *G06V 30/19* | (2022.01) |
| *G06V 30/10* | (2022.01) |

(52) U.S. Cl.
CPC ........ *G06V 20/46* (2022.01); *G06V 30/19173* (2022.01); *G06V 40/16* (2022.01); *G06V 40/172* (2022.01); *H04N 21/439* (2013.01); *H04N 21/4312* (2013.01); *H04N 21/44* (2013.01); *H04N 21/442* (2013.01); *H04N 21/466* (2013.01); *H04N 21/8549* (2013.01); *G06V 30/10* (2022.01)

(58) Field of Classification Search
CPC ............... H04N 21/251; H04N 21/466; H04N 21/4312; H04N 21/233
See application file for complete search history.

(56) References Cited

U.S. PATENT DOCUMENTS

| | | | | |
|---|---|---|---|---|
| 2007/0212023 | A1* | 9/2007 | Whillock | H04N 21/4532 386/281 |
| 2015/0189233 | A1* | 7/2015 | Carpenter | H04N 7/15 348/E7.083 |
| 2016/0014482 | A1* | 1/2016 | Chen | H04N 21/23418 386/241 |
| 2016/0105733 | A1 | 4/2016 | Packard et al. | |
| 2016/0247328 | A1 | 8/2016 | Han | |
| 2017/0099512 | A1 | 4/2017 | Osminer | |
| 2017/0164015 | A1 | 6/2017 | Abramov et al. | |
| 2017/0358273 | A1* | 12/2017 | Negi | G09G 5/003 |
| 2018/0032845 | A1* | 2/2018 | Polak | G06V 20/41 |
| 2018/0082716 | A1* | 3/2018 | Zhang | G11B 27/031 |
| 2018/0108380 | A1* | 4/2018 | Packard | G11B 27/34 |
| 2019/0089996 | A1 | 3/2019 | Surcouf et al. | |
| 2019/0266282 | A1* | 8/2019 | Mitchell | G06F 16/436 |

OTHER PUBLICATIONS

Bettadapura, V. et al., "Leveraging Contextual Cues for Generating Basketball Highlights", ACM (2016); 10 pgs.

Anonymous, "Predicting Soccer Highlights from Spatio-temporal Match Event Streams (Supplementary material)", Association for the Advancement of Artificial Intelligence (www.aaai.org), (2017); 4 pgs.

Jayaraman, D. et al., "Learning Image Representations Tied to Ego-Motion", In Proceedings of the IEEE International Conference on Computer Vision (ICCV), (2015); 9 pgs.

Ma, Y. et al., "A User Attention Model for Video Summarization", ACM Multimedia'02 (2002); 10 pgs.

Ma, S. et al., "Do Less and Achieve More: Training CNNs for Action Recognition Utilizing Action Images from the Web", arXiv:1512.07155v1 [cs.CV] Dec. 22, 2015; 9. pgs.

Noroozi, M. et al., "Unsupervised Learning of Visual Representations by Solving Jigsaw Puzzles", arXiv:1603.09246v2 [cs.CV] Jun. 26, 2016; 17 pgs.

Pathak, D. et al., "Context Encoders: Feature Learning by Inpainting", arXiv:1604.07379v2 [cs.CV] Nov. 21, 2016; 12 pgs.

Rav-Acha, A. et al., "Making a Long Video Short: Dynamic Video Synopsis", Proceedings of the 2006 IEEE Computer Society Conference on Computer Vision and Pattern Recognition (CVPR'06); 7 pgs.

Tang, A. et al., "#EpicPlay: Crowd sourcing Sports Video Highlights" ACM (2012); 4 pgs.

Wang, J. et al., "Walk and Learn: Facial Attribute Representation Learning from Egocentric Video and Contextual Data", arXiv:1604.06433v3 [cs.CV] Jun. 22, 2016; 10 pgs.

Xiong, Z. et al., "Audio Events Detection Based Highlights Extraction from Baseball, Golf and Soccer Games in a Unified Framework", Mitsubishi Electric Research Laboratories, Inc. (2003); 6 pgs.

Xiong, Z. et al., "Generation of Sports Highlights Using Motion Activity in Combination with a Common Audio Feature Extraction", Mitsubishi Electric Research Laboratories, Inc. (2003); 6 pgs.

Yao, T. et al., "Highlight Detection with Pairwise Deep Ranking for First-Person Video Summarization" IEEE Xplore (0000) 9 pgs.

Zhang, K., et al., "Video Summarization with Long Short-term Memory", In Proceedings of the European Conference on Computer Vision (ECCV), 2016; 17 pgs.

Zhang, D. et al., "Event Detection in Baseball Video Using Superimposed Caption Recognition", ACM (2000), 4 pgs.

Zhao, Z., et al., "Highlight Summarization in Sports Video Based On Replay Detection", IEEE (2006); 4 pgs.

List of IBM Patents or Patent Applications Treated as Related (2 pgs).

* cited by examiner

AUTO-CURATION AND PERSONALIZATION OF SPORTS HIGHLIGHTS

BACKGROUND

Technical Field

The present disclosure generally relates to automatic creation of media data.

Description of the Related Art

Recent advances in machine learning and computer vision made great progress in artificial intelligence tasks such as semantic segmentation, object detection and recognition, and action classification. Visual features can be learned by training machine learning models such as deep neural networks for the task of object recognition or action recognition using labeled images and videos as training sets.

SUMMARY

Some embodiments of the disclosure provide a method or system for auto-curating sports highlights from media content. Audible and visual cues from the player, spectators, and the commentator are extracted from the media content and fused to determine a sports game's most exciting moments. The system processes the video and audio of the media content to recognize visible and audible cues as markers. The visible and audible cues being detected may include visible celebratory actions of a player (such as high-fives and fist pumps), visible facial expression of player, audible cheering of spectators, audible excited tone and words of a commentator (such as "beautiful shot" or other expressions of excitement). The visible cues may also include on-screen overlay information and detected scene change (or shot boundary detection).

In some embodiments, the system receives the media content. The system identifies a set of markers for the media content. The markers include multi-modal excitement features that are identified from different types of audible and visual cues. The system identifies or proposes segments in the media content based on the identified set of markers. The system computes an excitement score for each segment based on the identified markers that fall within the segment. The system produces a highlight clip by identifying segments based on excitement scores.

In some embodiments, the system also extracts metadata for each segment. The extracted metadata of a segment may include an identity of a player that is extracted by performing (i) facial recognition or (ii) optical character recognition (OCR) on the video data of the segment. The metadata of the segment is based on on-screen overlay information, contextual cues from environment, statistics, location, and time extracted from the video data and audio data of the segment. The system may receive a set of criteria for producing the highlight clip by identifying segments having extracted metadata that matches the set of criteria.

In some embodiments, the set of markers are based on recognition classifiers for the visible and audible cues. A first recognition classifier may be used to select training examples to train a second recognition classifier. The extracted metadata may be used to collect training examples for training a recognition classifier. The system may extract a name for a segment based on on-screen overlay information, detects faces in the segment, and trains a facial recognition classifier to associate the detected faces with the extracted name.

The preceding Summary is intended to serve as a brief introduction to some embodiments of the disclosure. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a Summary, Detailed Description and the Drawings are provided. Moreover, the claimed subject matter is not to be limited by the illustrative details in the Summary, Detailed Description, and the Drawings, but rather is to be defined by the appended claims, because the claimed subject matter can be embodied in other specific forms without departing from the spirit of the subject matter.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

In a major professional golf tournament such as Masters, for example, with 90 golfers playing multiple rounds over four days, video from every tee, every hole and multiple camera angles can quickly add up to hundreds of hours of footage. The tremendous growth of video data has resulted in a significant demand for tools that can accelerate and simplify the production of sports highlight packages for more effective browsing, searching, and content summarization.

Some embodiments of the disclosure provide a method or system for auto-curating sports highlights from media content. Audible and visual cues from the player, spectators, and the commentator are extracted from the media content and fused to determine a sports game's most exciting moments. The system processes the video and audio of the media content to recognize visible and audible cues as markers. The visible and audible cues being detected may include visible celebratory actions of a player (such as high-fives and fist pumps), visible facial expression of player, audible cheering of spectators, audible excited tone and words of a commentator (such as "beautiful shot" or other expressions of excitement). The visible cues may also include on-screen overlay information and detected scene change (or shot boundary detection).

In some embodiments, the system receives the media content. The system identifies a set of markers for the media content. The markers include multi-modal excitement features that are identified from different types of audible and visual cues. The system identifies segments in the media content based on the identified set of markers. The system computes an excitement score for each segment based on the identified markers that fall within the segment. The system produces a highlight clip by identifying segments based on excitement scores.

Figure 1:
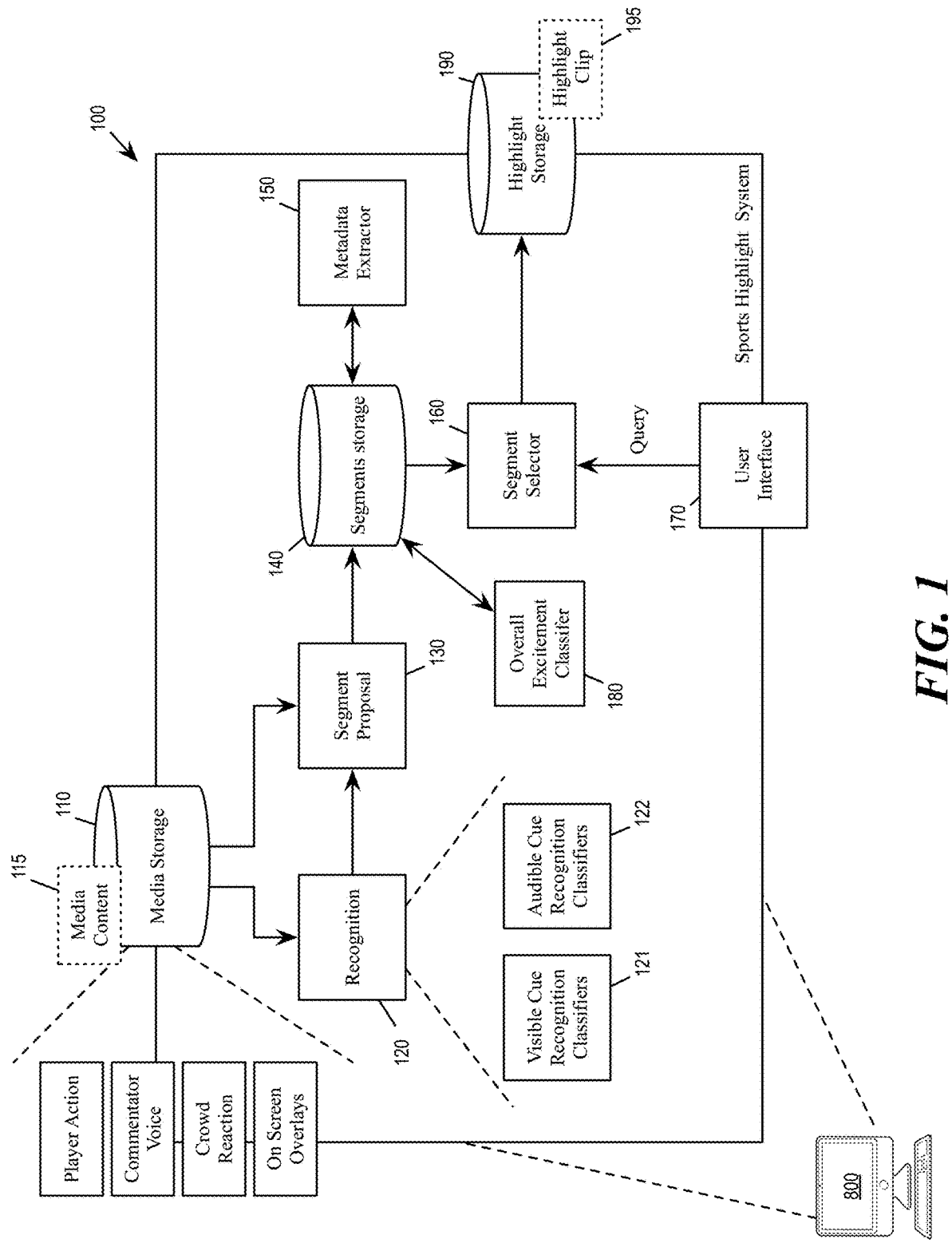
FIG. 1 illustrates an example highlight system that automatically curates sports highlights from media content.

FIG. 1 illustrates an example highlight system 100 that automatically curates sports highlights from a piece of media content. The system receives the media content 115 of a sporting event (e.g., a golf tournament), processes the received media to recognize audible and visual cues in the media. Based on the recognized audible and visual cues in the media, the system identifies exciting moments in the media content and produces a highlight clip 195. In some embodiments, the system 100 may receive a user input querying for a particular type of highlight clip (e.g., for a particular player, for a particular type of play), and the system produces the highlight clip 195 by identifying segments of the media content that matches the user query.

As illustrated, a computing device 800 implements the sports highlight system 100. The sports highlight system 100 includes a media storage 110, a recognition module 120, a segment proposal module 130, a segment storage 140, a metadata extractor module 150, a segment selector 160, a user interface 170, an overall excitement classifier 180, and a highlight storage 190. In some embodiments, the modules 110-190 are modules of software instructions being executed by one or more processing units (e.g., a processor) of the computing device 800. In some embodiments, the modules 110-190 are modules of hardware circuits implemented by one or more integrated circuits (ICs) of an electronic apparatus. Though the modules 110, 120, 130, 140, 150, 160, 170, 180 and 190 are illustrated as being separate modules, some of the modules can be combined into a single module. For example, in some embodiments, the segment selector 160 can be implemented as a function of the user interface 170.

The computing device 800 will be described by reference to FIG. 8 below.

The computing device receives the media content 115 from a media source through a communications interface from a network, an external storage device, or any other data transmission or storage medium. The received media content 115 may be a media clip retrieved from a storage medium, or streaming media data transmitted by a media source. The media content 115 may include video and audio of a sports event such as a golf tournament or a tennis match. The media content 115 captures, in its video and audio, visible actions and audible sounds made by the players of the event, the spectators at the event, the commentators about the event, and others observing the event. The media content may also include on-screen overlay information (e.g., television graphics), which may show a player's name, a particular stage of the sports event (e.g., at the $18^{th}$ hole), statistics regarding the game and/or the player, and other contextual information. At least some of the on-screen overlay includes visible text. The received media content is stored in the media storage 110 for processing by the computing device 100

The recognition module 120 detects visible and audible cues from the video and audio content of the media content 115. In some embodiments, a set of recognition classifiers 121 are used to recognize the visible cues and a set of audible cue recognition classifiers 122 are used to recognize the audible cues. The recognition module 120 also computes various excitement measures based on the recognized visible and audible cues. The overall excitement classifier 180 is trained to produce an overall excitement score by fusing multiple different excitement measures from the output of the visible and audible cue recognition classifiers 121 and 122.

The segment proposal module 130 uses the recognized audible and visible cues to identify segments of the media content 115 that may be included in the highlight clip 195. In some embodiments, the segment proposal module proposes segments by identifying a start and an end of each segment based on on-screen overlay information, scene change, visual event recognition, sensor-based event recognition, and audio-based excitement measures. The identification of start and end points of a proposed segment will be further described by reference to FIG. 3. The segment proposal module may propose many segments for many different players, different contexts, different environment, different excitement levels, etc. The proposed segments may overlap each other such that a particular exciting moment in the media content may be included in multiple different segments.

The segment storage 140 stores information regarding each segment, including the start point and end point of each segment. The segment storage 140 may also store the excitement measures of each segment. The information stored for a segment may also include metadata extracted from the media content 115 regarding the segment.

The metadata extractor 150 processes each segment to extract metadata to be stored as part of the information associated with the segment in the segment storage 140.

The segment selector 160 selects one or more segments of the media content 115 to generate the highlight clip 195. The segment selector can retrieve the start and the end of each segment from the segment storage 140, along with metadata, the excitement score, and other information. The segment selector 160 may select segments based on a set of predetermined criteria. For example, the segment selector may select segments having an excitement score higher than a specified threshold. The segment selector may also rank the clips based on their excitement scores and select clips based on the their ranking. The segment selector 160 may also select segments having metadata or other information that meets a set of received criteria. For example, the segment selector 160 may select segments featuring a particular player selected by the user through the user interface 170. The segment selector 160 packages the selected segments into the highlight clip 195.

The user interface 170 provides the set of criteria for selecting segments to be part of the final highlight clip 195. Examples of the user interface will be described by reference to FIG. 8 below.

The highlight storage 190 receives the highlight clip 195 generated by the segment selector 160. The computing device 800 may transmit the stored highlight clip 195 through a communications interface to a network or an external storage device.

Figure 2:
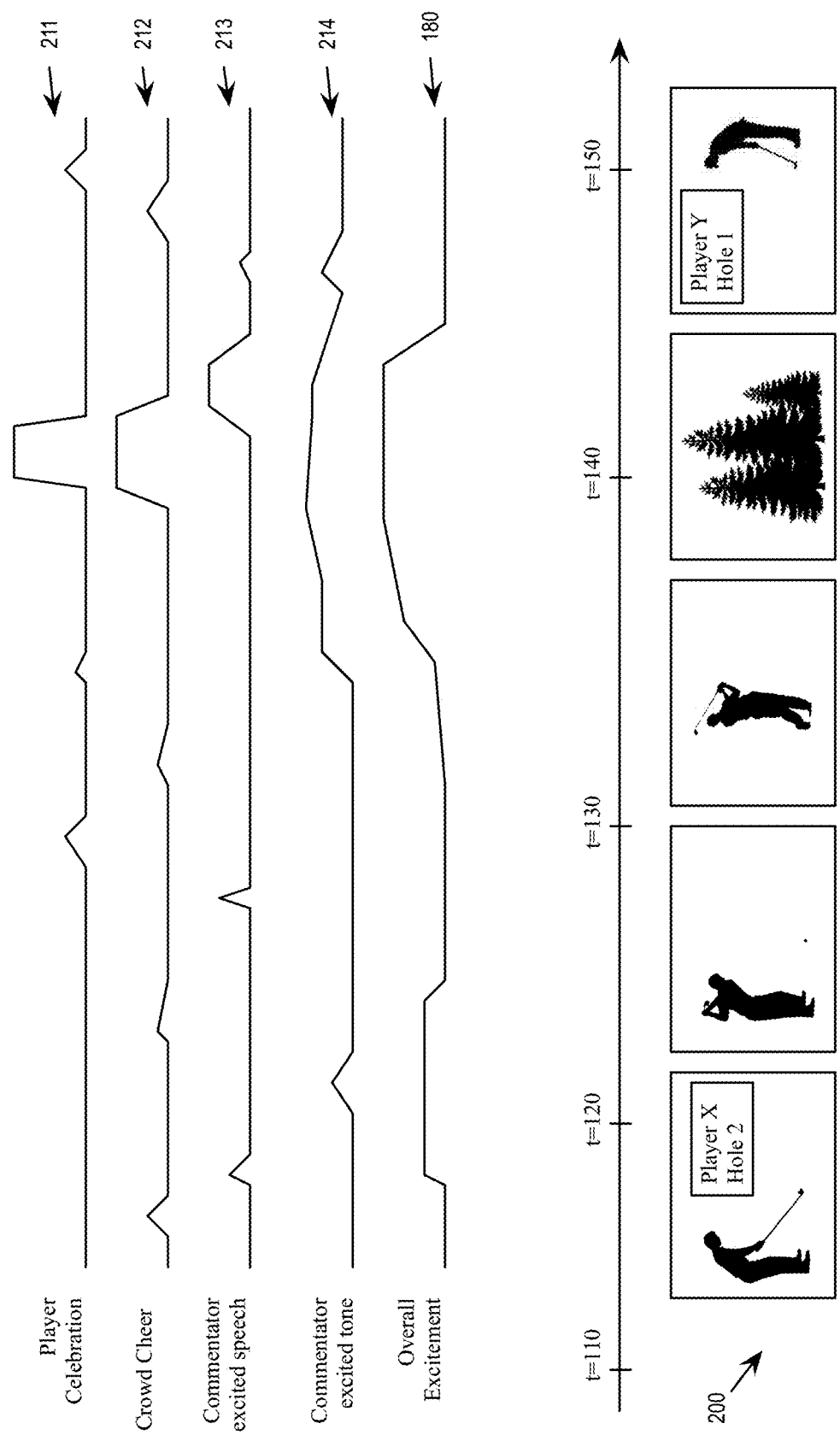
FIG. 2 conceptually illustrates the detection of audible and visual cues by the sports highlight system, consistent with an exemplary embodiment.

FIG. 2 conceptually illustrates the detection of audible and visual cues by the sports highlight system 100, consistent with an exemplary embodiment. The figure illustrates the output of recognition classifiers for a piece media content 200 that features a golf tournament. The figure illustrates outputs of several recognition classifiers, including output of a player celebration classifier 211, output of a crowd cheer classifier 212, output of a commentator excited speech classifier 213, and output of a commentator excited tone classifier 214. Each classifier performs recognition by analyzing the audio or video content at different points of the media content 200.

The output of a classifier may serve as an excitement measure at different points or time instances of the media content 200. The output of a classifier may also serve as a marker that indicates that a particular audible or visible cue is found at a particular point of the media content, e.g., crowd cheering, a player celebrating, a commentator using excitement words, or a commentator speaking in excited tone. Some of these markers are excitement markers that are used to identify important moments of the sports event. A player celebrating (fist-pump, high-fives, facial expression) is used as a visual maker of excitement, while crowd cheering is used as an audio marker of excitement. Similarly, a commentator's tone while describing the shot can also be used as an audio marker of excitement. In some embodiments, the sports highlight system 100 uses two audio markers to determine the position and excitement level of a potential highlight clip.

In addition to audible and visible cues in the media content, a set of social media excitement measures can also be used to generate markers for excitement. For example, in some embodiments, number of mentions of a particular player or a particular play can be compared with a threshold and used as an excitement marker.

In the example, player celebration is detected by the classifier 211 near t=140, crowd cheer is also detected by the classifier 212 near t=140. Excited commentator speech is detected by classifier 213 near t=142. Excited commentator tone is detected by classifier 214 near t=135 and extend beyond t=140. Correspondingly, an overall excitement measure (produced by the overall excitement classifier 180) shows a rising level of excitement sometime after t=135 lasting beyond t=142. In some embodiments, this overall excitement measure is produced by the classifier 180 that is trained to fuse the output of the other excitement measures, such as the outputs from the classifiers 211-214.

In some embodiments, a machine learning classifier such as a deep convolutional neural network can be used to construct audio-based classifiers for both crowd-cheering and commentator tone excitement. The deep convolutional neural network architecture can learn representations of environmental sounds from a large scale set (e.g., millions) of unlabeled videos and/or audio clips. In some embodiments, features are extracted from the a layer of the network to represent audio windows of a set length. One key advantage of using such a rich representation pre-trained on millions of environmental sounds is the direct ability to build powerful linear classifiers for cheer and commentator tone excitement detection with relatively few audio training examples (e.g., 28 positive and 57 negative training samples for the audio-based commentator excitement classifier). An iterative refinement bootstrapping methodology may be adopted to construct the audio-based classifiers.

For the crowd cheering classifier 212, the classifier can be trained using a machine learning classifier such as linear support vector machine (SVM) based on replay video of similar sports events (e.g., a highlight system for golf tournaments uses replay video of golf tournaments) to provide positive and negative samples.

For the commentator excited tone classifier 214, deep audio features are used to model excitement in a commentator's tone. A linear SVM classifier is used for modeling. For negative examples, audio tracks including regular speech, music, regular cheer, and other kinds of sounds without commentator excitement, are used for training. For commentator excited speech classifier 213, a dictionary of expressions (words and phrases) indicative of excitement (e.g., "great shot", "fantastic") is created. Each expression is assigned an excitement score ranging from 0 and 1. A speech-to-text service is used to obtain a transcript of the commentator's speech, and the dictionary is used to create an excitement score as an aggregate of scores of individual expressions in the speech. In some embodiments, the tone-based commentator excitement measure and the text-based commentator excitement measure are averaged to obtain an overall level of excitement for the commentator.

For the player celebration classifier 211, audio-based classifiers 212-213 (crowd cheer classifier and commentator excitement classifiers) at a low threshold are used to select video segments for training, since the player celebration is often accompanied by crowd cheer and/or commentator excitement. In some embodiments, still images are used to train the player celebration classifier 211.

Figure 3:
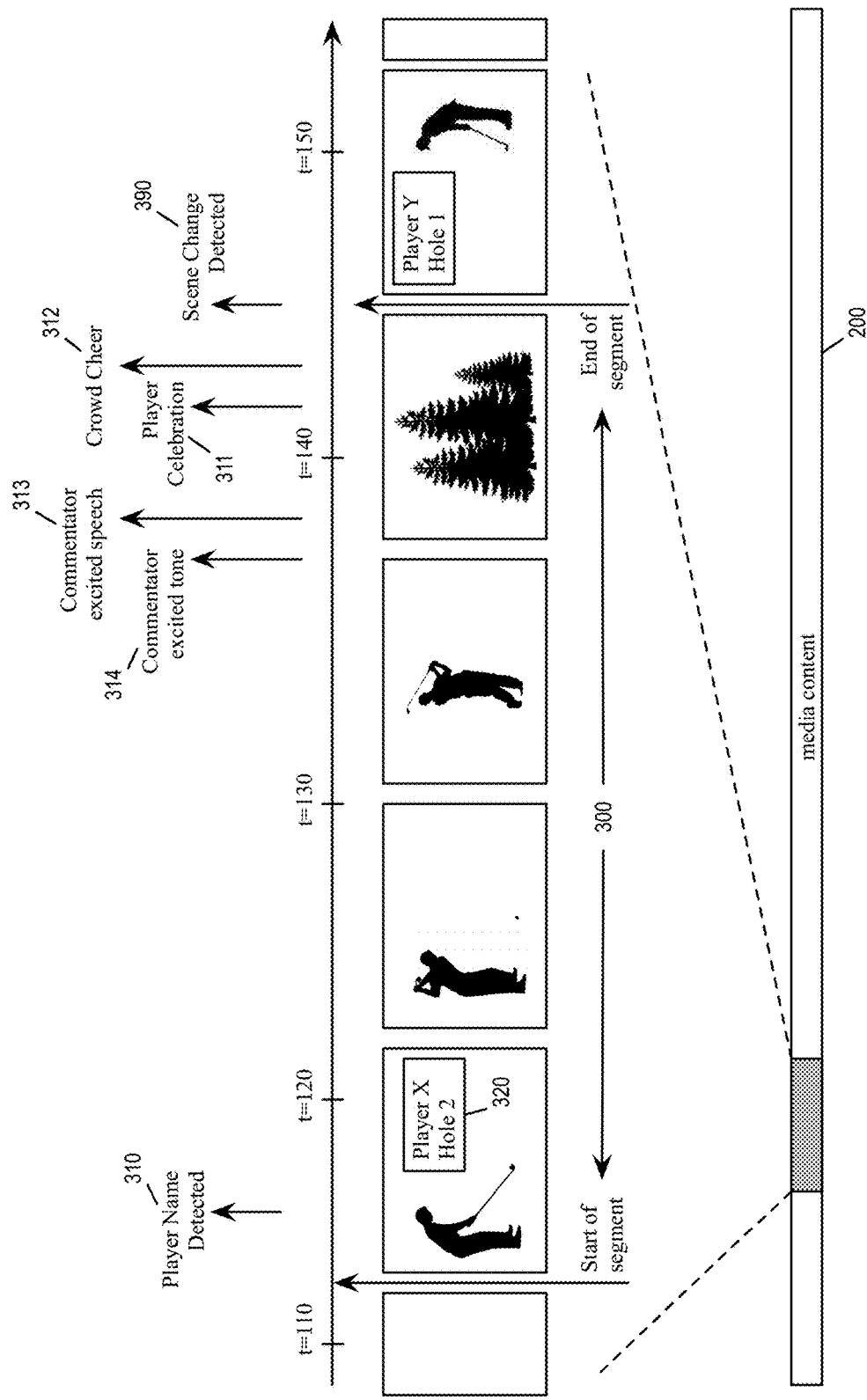
FIG. 3 conceptually illustrates using segmentation markers to define start and end points of each segment, consistent with an exemplary embodiment of the disclosure.

As mentioned, the highlight system generates the highlight clip 195 by packaging one or more segments of the media content 115, and the segment proposal module 130 uses the identified audible and visible cues as segmentation markers to define a start point and an end point of each segment. FIG. 3 conceptually illustrates using segmentation markers to define start and end points of each segment, consistent with an exemplary embodiment of the disclosure.

The figure shows a portion of the media content 200 that spans from before t=110 to after t=150. The highlight system 100 uses output of the classifiers 211-214 to identify several markers, including a commentator excited tone marker 314, a commentator excited speech marker 313, a crowd cheer marker 312, and a player celebration marker 311. In some embodiments, each of these markers is identified when the output of the corresponding classifiers rises above a specified threshold.

In addition to audible and visible excitement markers 311-314 produced by classifiers 211-214, the highlight system 100 also detects other markers for identifying start and endpoints of a segment. For example, the highlight system detects a player name marker 310, which corresponds to the presence of TV graphics 320 that includes the name of a player and a stage of the golf game ("player X at hole 2"). The highlight system also detects shot boundary markers that correspond to scene changes. In the example, the shot boundary marker 390 corresponds to a scene change that took place after the occurrence of excitement markers 311-314.

The highlight system 100 (at the segment proposal module 130) sets the start and end points of a segment 300 by using the identified markers 310-314 and 390. For example, the highlight system 100 may set the start point of the segment at a specified point before the player name marker 310, such as at the most recent scene change before the player name marker 310, or a few seconds before the player name marker 310. The highlight system 100 may set the end point of the segment at the earliest scene change after a particular excitement marker (e.g., at the scene change 390 after the crowd cheer marker 312). In some embodiments, standard shot boundary or scene change detection based on color histograms is used as a visual marker to determine the end of a segment.

In a professional golf tournament broadcasts, a golf swing is generally preceded by a TV graphics of the name of the player who is just about to hit the golf ball and other information about the shot. Such markers can be detected at specific locations of video or based on distinct colors. In some embodiments, the highlight system 100 checks for such colors in the video to locate the TV graphics bounding box (e.g., the box 320). In some embodiments, a TV graphics detector is trained to detect TV graphics at any spatial location of the video. OCR is then applied within the detected region in order to extract metadata such as the name of the player, statistics, and information about the game. The highlight system associates this information with the segment, allowing personalized queries and highlight generation based on a viewer's favorite players.

The multimodal markers are used to identify segments as potential highlights. In some embodiments, the highlight system 100 generates segments based on the crowd cheering markers. Specifically, crowd-cheering detection is performed on a continuous segment of the media content 115 and positive scores from the cheering detection are tapped to point to potentially important cheers in audio. In some embodiments, windows with positive excitement scores are used to mark the end of a bout of contiguous crowd cheer. Each distinct cheer marker is then evaluated as a potential candidate for a highlight using the presence of a TV graphics marker including a player name and hole number within a preset duration threshold (e.g., 80 seconds). In some embodiments, the start point of the segment is set at 5 seconds before the appearance of a TV graphics marker. In order to determine the end of the segment, the highlight system 100 performs shot boundary detection in a 5 second video segment starting from the end of the crowd cheer marker (e.g., 312). If a shot boundary is detected, the end of the segment is set at the scene change point.

The multimodal markers are also used to assign excitement scores to the segments. In some embodiments, the highest excitement measure for crowd cheering within a segment is set as the crowd cheer marker score for the segment. Once a baseline score has been computed, the highlight system 100 performs further search (by using recognition classifiers) to determine if the segment contains player celebration action, excitement in commentators' tone, or exciting words or expressions used to describe the action in the segment. In some embodiments, the audible excitement measures, such as crowd cheering and commentator excitement, are measured based on 6-second windows of audio samples taped from the media content 200. Similarly, the visual player celebration action recognition is performed on frames sampled at 1 fps. In order to determine the overall excitement level of a segment, the highlight system 100 incorporates available evidence from all audio, visual, and textual based classifiers that fall within the segment.

In some embodiments, the highlight system 100 aggregates and normalizes positive scores for markers that fall within a timing window of a particular excitement marker (e.g., the crowd excitement marker 312). For example, the highlight system 100 may aggregate and normalize positive scores for player celebration excitement measure within a 15 second window of the crowd cheer excitement marker and for excited commentator tone and words excitement measure within a 20 second window of the crowd cheer excitement marker. The highlight system 100 obtains the overall excitement score of the segment by using a linear fusion of scores obtained from crowd cheer, commentator excitement (audio and text-based), and player celebration action markers. In some embodiments, the weights for fusing the crowd cheer, commentator excitement tone, commentator excitement speech, and player celebration action components are set as equal, or can be learned from a labeled set of video clips.

Figure 4:
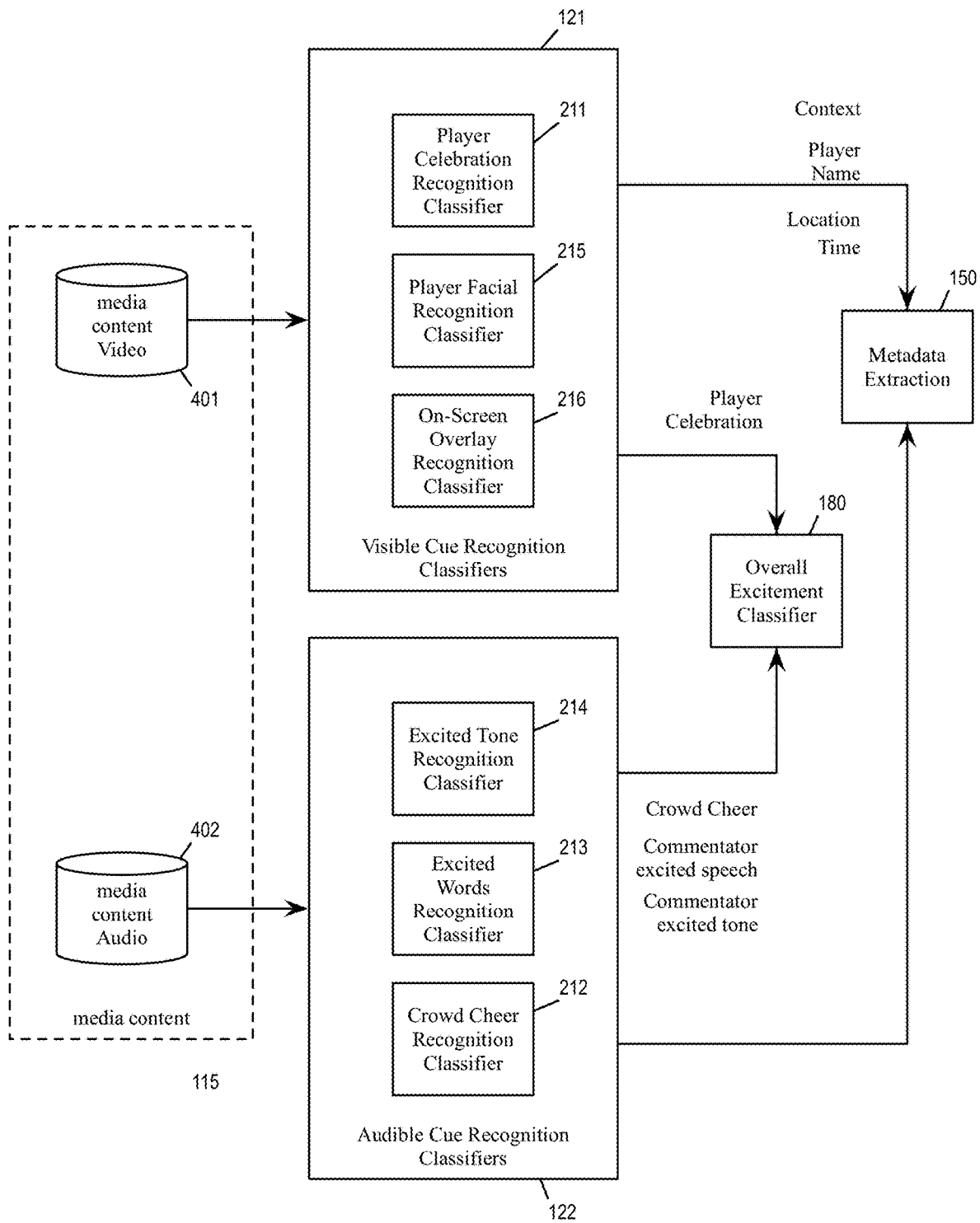
FIG. 4 conceptually illustrates the processing of audio and video content of the media content.

FIG. 4 conceptually illustrates the processing of audio and video content of the media content. Specifically, the figure illustrates the computation of the excitement score by the recognition module 120 and the extraction of metadata from the audio and video content of the media content 115 by the metadata extraction module 150.

As illustrated, the media content 115 includes both video data 401 and audio data 402. The visible cue recognition classifiers 121 process the video data 401. The visible cue recognition classifiers 121 include the action recognition classifiers 211 that recognize various action of a player in the video of the media content, including celebratory actions such as a fist-pump. The visible cue recognition classifiers 121 also include on-screen overlay information recognition classifiers 216, which may include optical character recognition (OCR) capability that extracts text from TV graphics. The visible cue recognition classifiers 121 may also include a player facial recognition classifier 215 for ascertaining the identities of the players in the event.

The audible cue recognition classifiers 122 process the audio data 402. The audible cue recognition classifiers 122 includes the crowd cheer recognition classifier 212 and the excited tones recognition classifier 214. The audible cue recognition classifier also includes excited speech recognition classifier 213 that recognizes spoken words that indicate excitement by the commentator.

The overall excitement classifier 180 is trained to produce an overall excitement score by fusing multiple different excitement measures from the output of the visible and audible cue recognition classifiers 121 and 122. The overall excitement classifier 180 computes the overall excitement score for each segment by fusing the different excitement measures of that segment. The overall excitement classifier 180 may aggregate and normalize positive scores for markers that fall within a timing window of a particular excitement marker (e.g., the crowd excitement marker 312). In some embodiments, in addition to the audio-based and video-based excitement measures, the highlight system 100 also includes a set of social media excitement measures when producing the overall excitement score.

The metadata extractor 150 extracts information from the audio and video content of the media content regarding the sports event featured in the media content 115. The metadata extractor 150 may extract information such as names of players, stages of the sports event, statistics regarding players, location, time, and other contextual information. The metadata extractor 150 may leverage the output of the various visible or audible cue recognition classifiers, such extracting player names by using player facial recognition classifier 215, on-screen overlay recognition classifier 216, and/or a speech-to-text service in the excited words recognition classifier 213. In some embodiments, the metadata extractor 150 extracts the metadata for each segment such that each segment is associated with its own set of metadata.

Figure 5:
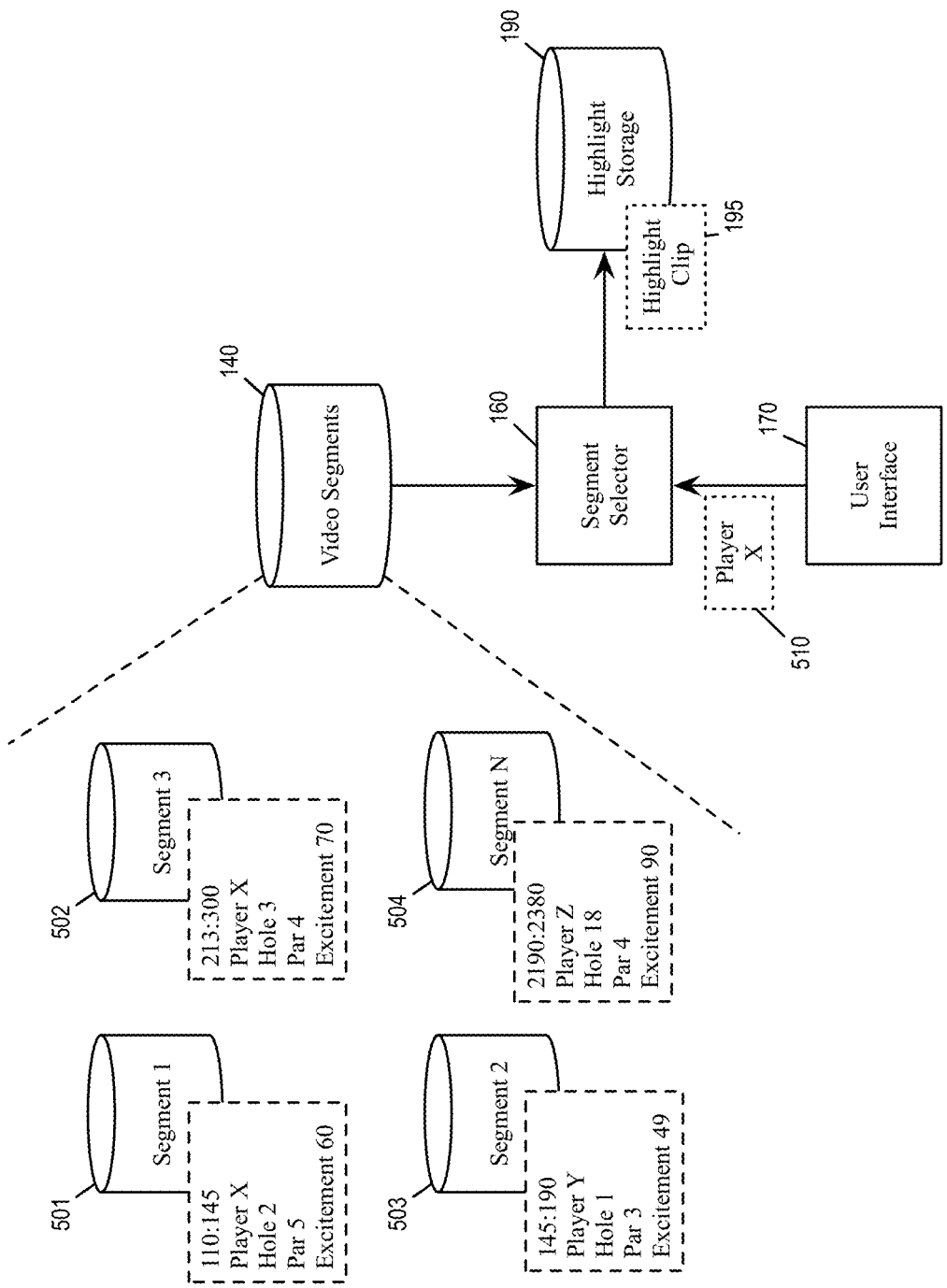
FIG. 5 illustrates using metadata or excitement score to select one or more segments for producing the highlight clip.

FIG. 5 illustrates using metadata or an excitement score to select one or more segments for producing the highlight clip 195. As illustrated, the video segment storage 140 stores information for various segments 501-504. For each segment, the video segment storage 140 stores its start and end points as well as its associated various extracted metadata. The video segment storage 140 also stores an overall excitement score for each segment.

For example, the information associated with the segment 501 indicates that the identity of the player featured in the segment is "player X," the stage of the event (golf tournament) is "hole 2," additional contextual information "par 5," while the overall excitement score of the segment 501 is 60. The information associated with the segment 504 indicates that the identity of the player featured in the segment is "player Z," the stage of the event (golf tournament) is "hole 18," additional contextual information "par 4," while the overall excitement score of the segment 504 is 90. The identities of the featured player, the stage of the event, and the additional contextual information are extracted metadata based on facial recognition and on-screen information recognition. The excitement score of each segment is a fused score based on multiple different excitement measures from different audible and visible cues that fall within the segment.

The user interface 170 allows a search of a highlight based on a set of criteria 510, such as a player's name and/or an excitement score. The user interface 170 receives a query specifying the set of criteria 510 for generating the highlight clip, and the segment selector 160 selects one or more segments based on the received criteria. For example, if the user interface 170 receives a query for "player X," then segment selector would generate the highlight clip 195 based on segments 501 and 503, whose metadata indicates "player X". If the user interface 170 specifies a specific excitement level, say greater than 80, then the segment selector 160 would select segment 504, whose excitement score is 90. In some embodiments, the highlight system 100 uses a default excitement level for selecting segments to generate the highlight clip when there is no user provided criteria.

In some embodiments, the highlight system 100 performs self-supervised training for its various recognition classifiers. Specifically, a first excitement classifier is used to select training examples (e.g., by annotating or labeling a subset of audio or video data) to train a second excitement classifier. In some embodiments, the extracted metadata (e.g., the name of an action or player) is used to collect training examples for training an action recognition classifier or a facial recognition classifier (e.g., for recognizing a visible action of a player or recognizing a face of a player). In some embodiments, the name of a player is extracted for a segment based on on-screen overlay information (e.g., TV graphics and text from OCR) while faces are recognized in segment. The highlight system 100 would train a facial recognition classifier to associate detected faces with the extracted name.

Figure 6:
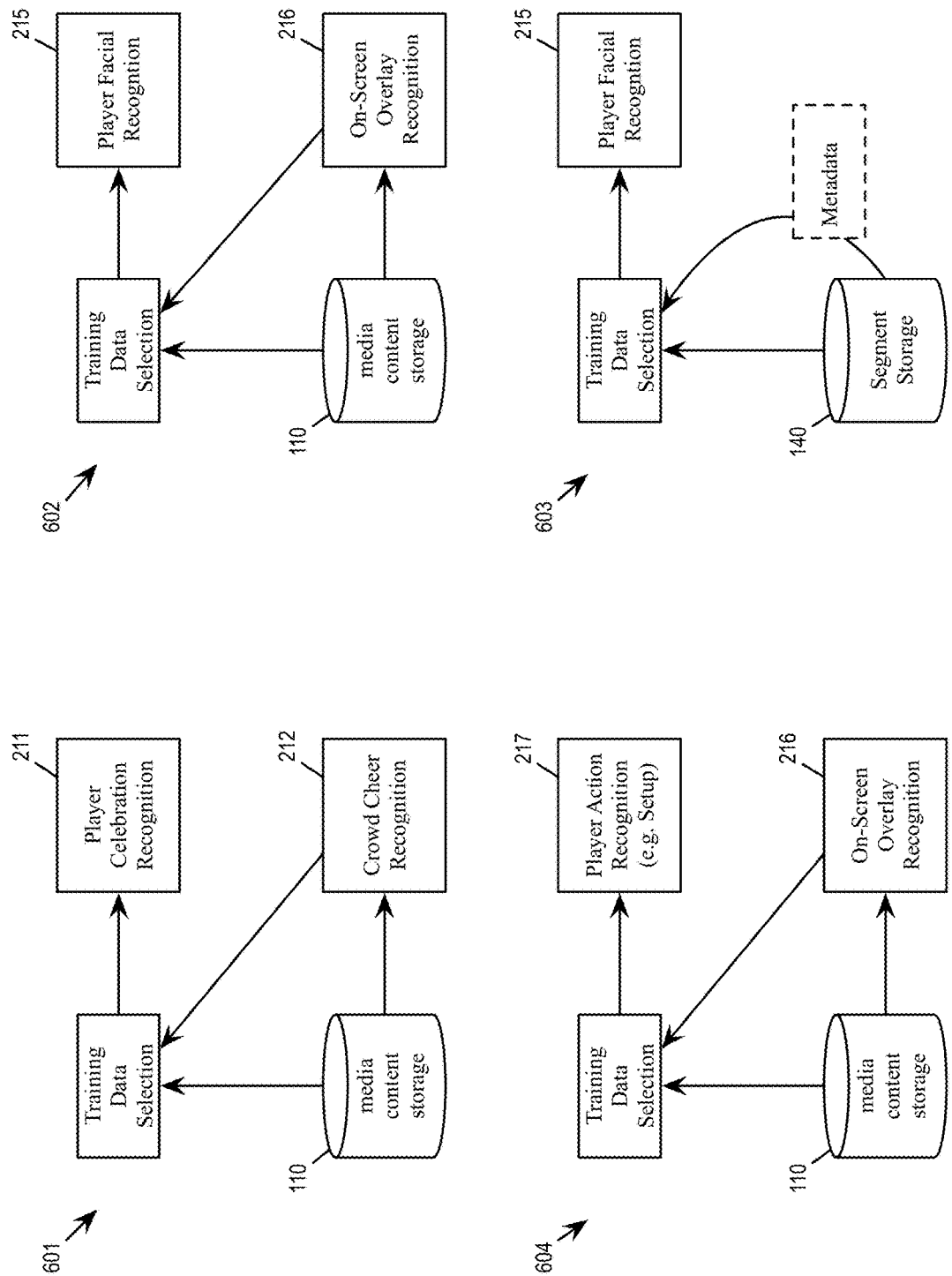
FIG. 6 conceptually illustrates self-supervised training for various classifiers in the highlight system, consistent with an exemplary embodiment.

FIG. 6 conceptually illustrates self-supervised training for various classifiers in the highlight system 100, consistent with an exemplary embodiment. The figure illustrates four such self-supervised training scenarios 601-604.

Scenario 601 illustrates self-supervised learning of the player celebration recognition classifier 211. As illustrated, the output of crowd cheering recognition classifier 212 is used to select or annotate portions of the media content 115 (in the media storage 110) for training the player celebration recognition classifier 211, since audible crowd cheering often occur contemporaneously with visible player celebration action.

Scenario 602 illustrates self-supervised learning of the facial recognition classifier 215 by on-screen overlay recognition classifier 216. The on-screen overlay recognition classifier is used to select or annotate portions of the media content in which the name of a particular player appears in a TV graphic, and the player facial recognition classifier 215 is trained to associate the name of the particular player with faces that appear in the selected portion of the media content. In some embodiments, the highlight system 100 detects faces within a temporal window of when a TV graphic with a player name is found. The assumption is that in the video images after the name of a player is displayed, the player's face will be visible multiple times in the video feed. Not all detected faces in that time window will represent the player of interest. Outliers are removed by using geometrical and clustering constraints. It is assumed that the distribution of all detected faces to be bi-modal, where the largest cluster includes faces of the players of interest. Faces that are too small are discarded, and faces in a central position of the frame are given preference.

Scenario 603 illustrates self-supervised learning of the facial recognition classifier 215 by metadata associated with a segment. As mentioned, the metadata of a segment identifies the name of a particular player. Segments with metadata that identifies the name of the particular player are selected from the segment storage 140 as training samples for training the facial recognition classifier 215. Though not illustrated, in some embodiments, the highlight system 100 retrieves social media data to gather names and images of players. The gathered names and images are used as training data for the facial recognition classifier 215.

Scenario 604 illustrates self-supervised learning of a player action recognition classifier 217 by on-screen overlay recognition classifier 216. Specifically, the highlight system 100 would use the detection of a particular type of TV graphics by the on-screen overlay classifier 216 to annotate portions of the media content as training data for certain types of action recognition classifiers. For example, in some embodiments, the appearance of TV graphics showing a player's name is used to annotate or select video frames in the media content for training an action recognition classifier that recognizes a player setting up a golf swing. To accelerate training, in some embodiments, the highlight system 100 crops images of players performing the particular action as training data.

Figure 7:
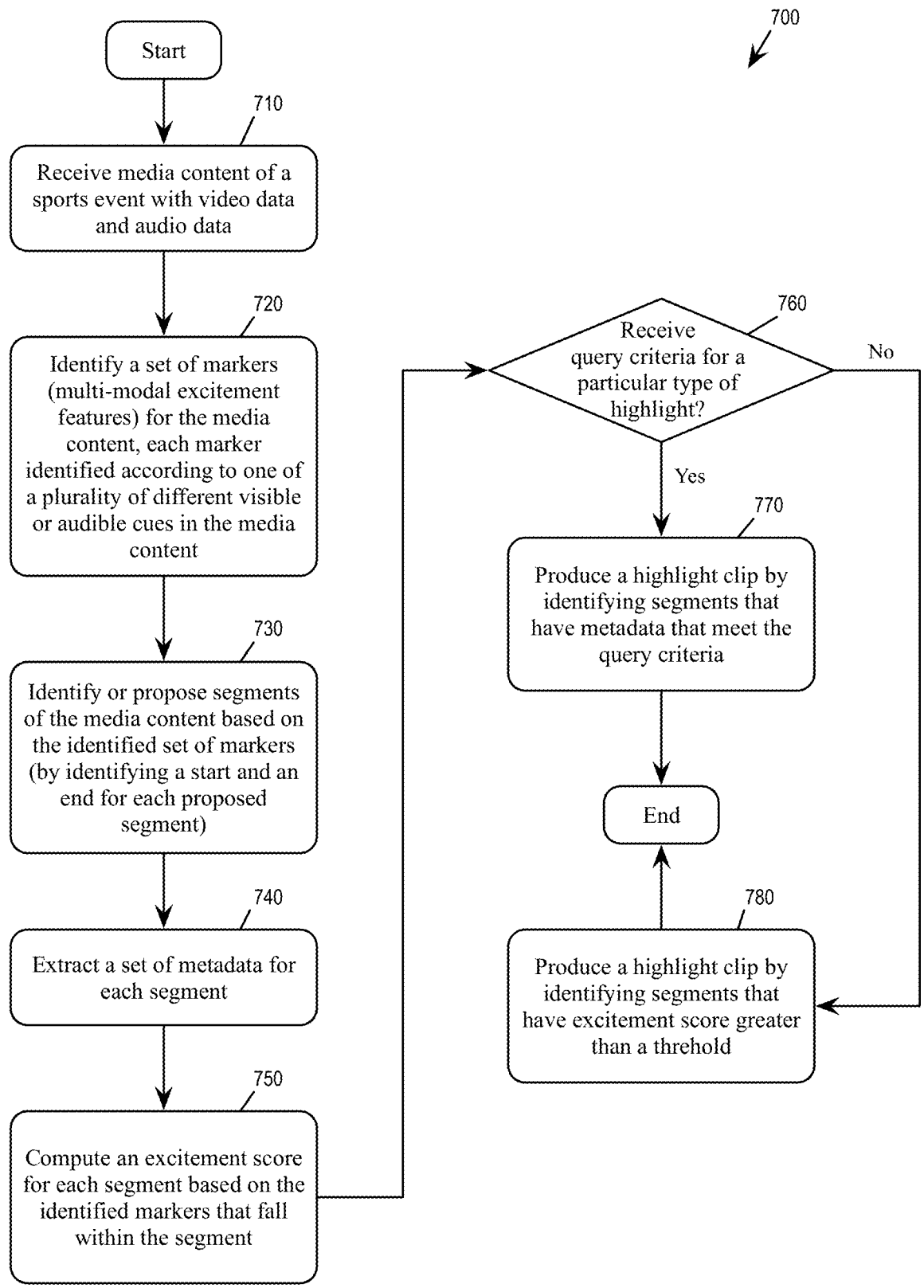
FIG. 7 conceptually illustrates a process for automatically generating a highlight clip based on the media content of a sports event.

FIG. 7 conceptually illustrates a process 700 for automatically generating a highlight clip based on the media content of a sports event. In some embodiments, one or more processing units (e.g., processor) of the computing device implementing the highlight system 100 (e.g., the computing device 800) perform the process 700 by executing instructions stored in a computer readable medium.

The highlight system 100 starts the process 700 by receiving (at 710) the media content of a sports event (e.g., a golf tournament) with audio data and video data. In some embodiments, the highlight system 100 also receives social media data (e.g., live chats, comments) regarding the sports event.

The highlight system 100 identifies (at 720) a set of markers. Each marker is identified according to one of multiple different visible or audible cues in the media content. The identified markers may include multimodal excitement features based on detections of different visible or audible cues of excitement such as crowd cheering, players celebrating, and excited commentator tone or expressions. The identified markers may also include markers based on on-screen overlay information such as TV graphics, texts, statistics, and scene changes. In some embodiments, the identified markers include inputs from social media contents that indicate interest and excitement regarding certain parts of the sports event.

The highlight system 100 identifies (at 730) or proposes segments of the media content based on the identified set of markers. The markers are used to identify the start and end of each segment. For example, the highlight system may identify the start of a segment based on the appearance of TV graphics and identify the end of the segment based on a detection of a scene change after one or more excitement markers, such as crowd cheering and player celebration.

The highlight system 100 extracts (at 740) a set of metadata for each segment. In some embodiments, the highlight system performs OCR on each segment to extract name of players, statistics, stage of the sports event, and other information from TV graphics as metadata for the segment. In some embodiments, the highlight system performs facial recognition on faces that appear in the segment to extract a name of a player as metadata for the segment.

The highlight system 100 computes (at 750) an overall excitement score for each segment based on the identified markers that fall within the segment. The system may aggregate and normalize positive scores for markers that fall within a timing window of a particular excitement marker as the excitement score of the segment. In some embodiments, a classifier that is trained to fuse other excitement measure produces the overall excitement measure.

The highlight system 100 determines whether it has received a set of query criteria (from the user interface) for a particular type of highlight, e.g., a request for highlight regarding a particular player or highlight regarding a particular stage of the sports event. If so, the process proceeds to 770. If the highlight system 100 does not receive a query for a particular type of highlight, the process proceeds to 780.

At 770, the highlight system produces a highlight clip by identifying the segments having metadata that meets the query criteria. The process 700 then ends.

At 780, the highlight system produces a highlight clip by identifying the segment having an excitement score greater than a threshold. The process 700 then ends.

Example Electronic System

The present application may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures (e.g., FIG. 7) illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 8:
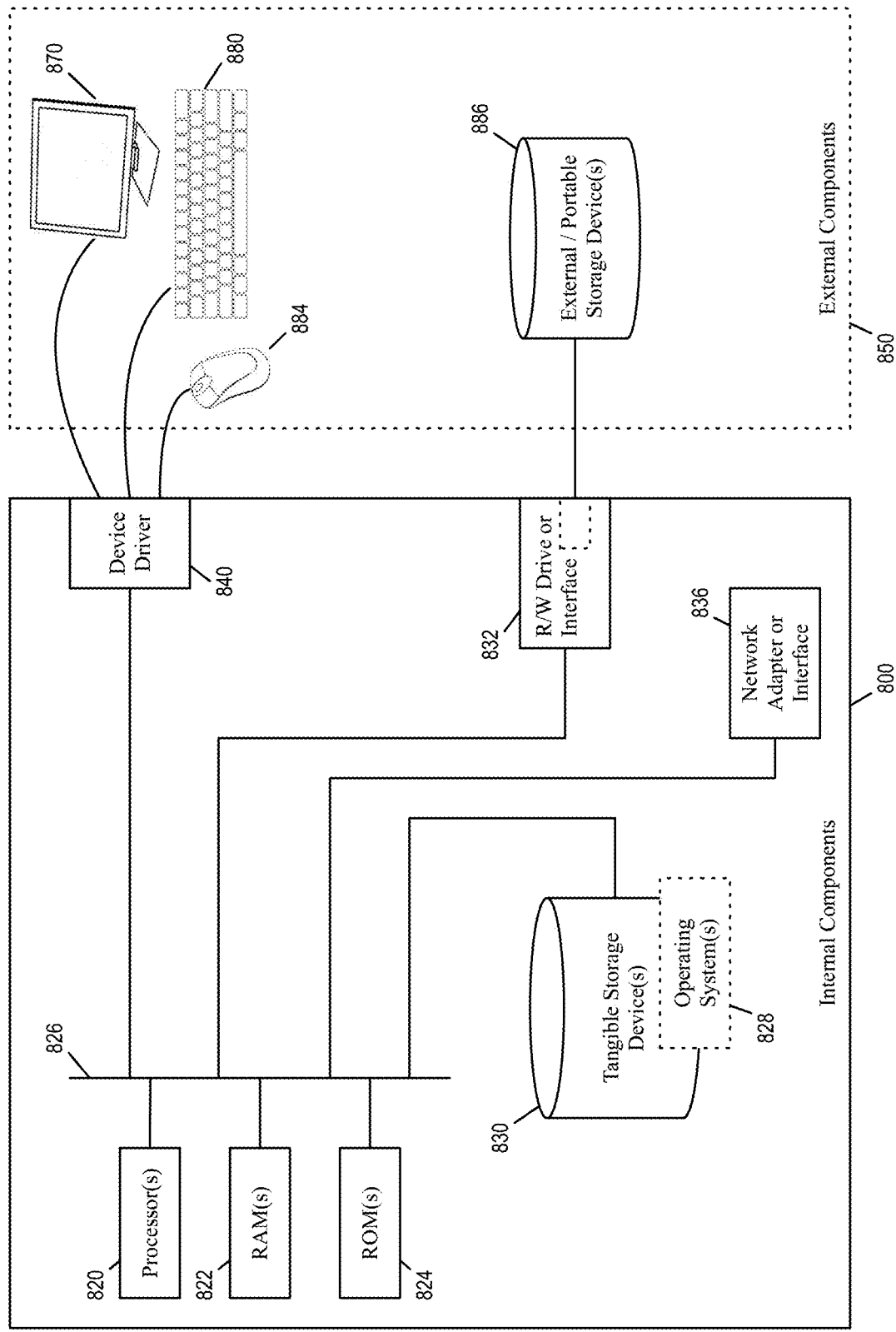
FIG. 8 shows a block diagram of the components of a data processing system in accordance with an illustrative embodiment of the present disclosure.

FIG. 8 shows a block diagram of the components of data processing systems 800 and 850 that may be used to implement a system for producing sports highlight clips (i.e., the highlight system 100) in accordance with an illustrative embodiment of the present disclosure. It should be appreciated that FIG. 8 provides only an illustration of one implementation and does not imply any limitations with regard to the environments in which different embodiments may be implemented. Many modifications to the depicted environments may be made based on design and implementation requirements.

Data processing systems 800 and 850 are representative of any electronic device capable of executing machine-readable program instructions. Data processing systems 800 and 850 may be representative of a smart phone, a computer system, PDA, or other electronic devices. Examples of computing systems, environments, and/or configurations that may represented by data processing systems 800 and 850 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The data processing systems 800 and 850 may include a set of internal components 800 and a set of external components 850 illustrated in FIG. 8. The set of internal components 800 includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and programs such as the programs for executing the process 700 are stored on one or more computer-readable tangible storage devices 830 for execution by one or more processors 820 via one or more RAMs 822 (which typically include cache memory). In the embodiment illustrated in FIG. 8, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

The set of internal components 800 also includes a R/W drive or interface 832 to read from and write to one or more portable computer-readable tangible storage devices 886 such as a CD-ROM, DVD, memory stick, magnetic tape, magnetic disk, optical disk or semiconductor storage device. The instructions for executing the process 700 can be stored on one or more of the respective portable computer-readable tangible storage devices 886, read via the respective R/W drive or interface 832 and loaded into the respective hard drive 830.

The set of internal components 800 may also include network adapters (or switch port cards) or interfaces 836 such as a TCP/IP adapter cards, wireless Wi-Fi interface cards, or 3G or 4G wireless interface cards or other wired or wireless communication links. Instructions of processes or programs described above can be downloaded from an external computer (e.g., server) via a network (for example, the Internet, a local area network or other, wide area network) and respective network adapters or interfaces 836. From the network adapters (or switch port adaptors) or interfaces 836, the instructions and data of the described programs or processes are loaded into the respective hard drive 830. The network may comprise copper wires, optical fibers, wireless transmission, routers, firewalls, switches, gateway computers and/or edge servers.

The set of external components 850 can include a computer display monitor 870, a keyboard 880, and a computer mouse 884. The set of external components 850 can also include touch screens, virtual keyboards, touch pads, pointing devices, and other human interface devices. The set of internal components 800 also includes device drivers 840 to interface to computer display monitor 870, keyboard 880 and computer mouse 884. The device drivers 840, R/W drive or interface 832 and network adapter or interface 836 comprise hardware and software (stored in storage device 830 and/or ROM 824).

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computing device comprising:
   a network interface;
   a processor; and
   a storage device storing a set of instructions, wherein an execution of the set of instructions by the processor configures the computing device to perform acts comprising:
   receiving media content over the network interface;
   identifying a set of multimodal markers for the media content comprising visible and audible cues in the media content;
   identifying segments in the media content based on the identified set of markers;
   extracting metadata for each segment;
   using the extracted metadata to collect training examples for training a recognition classifier;
   computing an excitement score for each segment based on the identified markers that fall within the segment comprising:
      receiving one or more visible cue recognition classifiers;
      receiving one or more audible cue recognition classifiers based on a deep convolutional neural network;
      applying a predetermined weighting of each cue recognition classifier; and
      calculating an overall excitement classifier by fusing each weighted audible and visible cue recognition classifier; and
   generating a highlight clip by identifying segments based on their excitement scores.

2. The computing device of claim 1, wherein the visible and audible cues comprise visible behaviors of a player, audible cheering of spectators, and an audible excited tone and words of a commentator.

3. The computing device of claim 2, wherein identifying the set of markers for the media content further comprises detecting on-screen overlay information and a scene change.

4. The computing device of claim 1, wherein partitioning the media content into the set of segments comprises identifying a start and an end of each segment based on at least one of: an on-screen overlay information, a scene change, a visual event recognition, a sensor-based event recognition, and an audio-based excitement measure.

5. The computing device of claim 1, wherein the execution of the set of instructions by the processor further configures the computing device to perform an act comprising extracting metadata for each segment.

6. The computing device of claim 5, wherein:
   the extracted metadata of a segment comprises an identity of a player;
   an extraction of the metadata is performed by at least one of:
      (i) a facial recognition; and
      (ii) an optical character recognition (OCR) on the video data of the segment.

7. The computing device of claim 5, wherein the metadata of the segment is based on at least one of an on-screen overlay information, one or more contextual cues from an environment, statistics, a location, and a time extracted from the video data and audio data of the segment.

8. The computing device of claim 5, wherein:
   the execution of the set of instructions by the processor further configures the computing device to receive a set of criteria, and
   producing the highlight clip further comprises identifying segments having extracted metadata that matches the set of criteria.

9. The computing device of claim 1, wherein the set of markers are based on recognition classifiers for the visible and audible cues.

10. The computing device of claim 9, wherein the execution of the set of instructions by the processor further configures the computing device to perform acts comprising using a first recognition classifier to select training examples to train a second recognition classifier.

11. The computing device of claim 1, wherein the execution of the set of instructions by the processor further configures the computing device to perform acts comprising using:
   extracting a name for a segment based on an on-screen overlay information;
   detecting faces in the segment;
   training a facial recognition classifier to associate the detected faces with a name.

12. The computing device of claim 1, wherein the execution of the set of instructions by the processor further configures the computing device to perform an act comprising training a classifier to produce the excitement score for each segment by fusing a plurality of excitement measures of the segment.

13. A computing device comprising:
   a network interface;
   a processor; and
   a storage device storing a set of instructions, wherein an execution of the set of instructions by the processor configures the computing device to perform acts comprising:
   receiving media content from the network interface;
   identifying a set of multimodal markers for the media content comprising visible and audible cues in the media content, comprising:
      identifying one or more visible cue recognition classifiers;
      identifying one or more audible cue recognition classifiers based on a deep convolutional neural network;

applying a predetermined weighting of each cue recognition classifier; and calculating an overall excitement classifier by fusing each weighted audible and visible cue recognition classifier;

proposing segments in the media content based on the identified set of markers;

extracting metadata for each proposed segment;

extracting metadata for each segment; and using the extracted metadata to collect training examples for training a recognition classifier;

receiving a set of criteria; and generating a highlight clip by identifying proposed segments having extracted metadata that matches the set of criteria.

14. The computing device of claim 13, wherein the visible and audible cues comprise visible behaviors of a player, audible cheering of spectators, and an audible excited tone and words of a commentator.

15. The computing device of claim 13, wherein:

the extracted metadata of a proposed segment comprises an identity of a player; and an extraction of the metadata is performed by at least one of:

(i) facial recognition; and;

(ii) optical character recognition (OCR) on the video data of the segment.

16. The computing device of claim 13, wherein the metadata of the proposed segment is based on at least one of: an on-screen overlay information, one or more contextual cues from an environment, statistics, a location, and a time extracted from the video data and audio data of the segment.

17. A computer program product comprising:

one or more non-transitory computer-readable storage device and program instructions stored on at least one of the one or more non-transitory storage devices, the program instructions executable by a processor, the program instructions comprising sets of instructions for:

receiving media content;

identifying a set of multimodal markers for the media content comprising visible and audible cues in the media content;

identifying segments in the media content based on the identified set of markers;

extracting metadata for each segment;

using the extracted metadata to collect training examples for training a recognition classifier;

computing an excitement score for each segment based on the identified markers that fall within the segment comprising:

receiving one or more visible cue recognition classifiers;

receiving one or more audible cue recognition classifiers based on a deep convolutional neural network;

applying a predetermined weighting of each cue recognition classifier; and calculating an overall excitement classifier by fusing each weighted audible and visible cue recognition classifier; and generating a highlight clip by identifying segments based on their excitement scores.

18. The computer program product of claim 17, wherein the visible and audible cues comprise visible behaviors of a player, an audible cheering of spectators, and an audible tone and words of a commentator.

19. The computer program product of claim 18, wherein identifying the set of markers for the media content further comprises detecting an on-screen overlay information and a scene change.

* * * * *